April 19, 1932. W. H. EWEND 1,854,892
GLARE SHIELD FOR VEHICLES
Filed Feb. 23, 1929 2 Sheets-Sheet 1
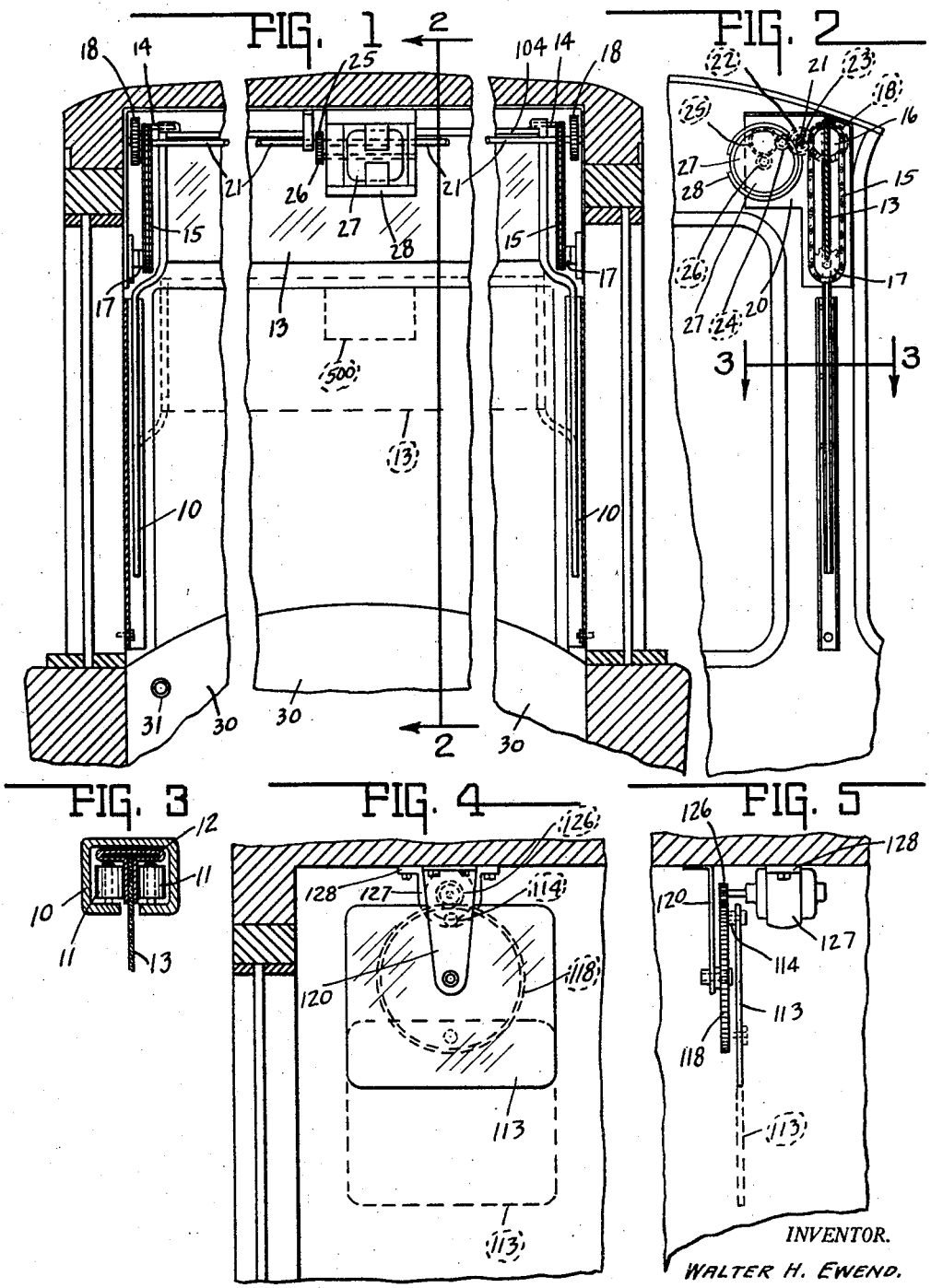
INVENTOR.
WALTER H. EWEND.
BY
ATTORNEYS.

April 19, 1932.  W. H. EWEND  1,854,892
GLARE SHIELD FOR VEHICLES
Filed Feb. 23, 1929   2 Sheets-Sheet 2
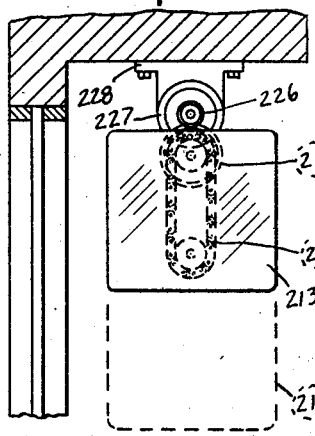
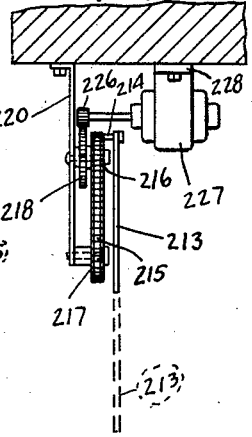
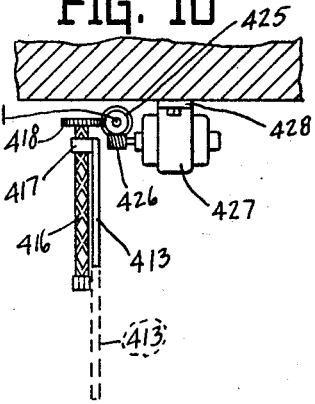
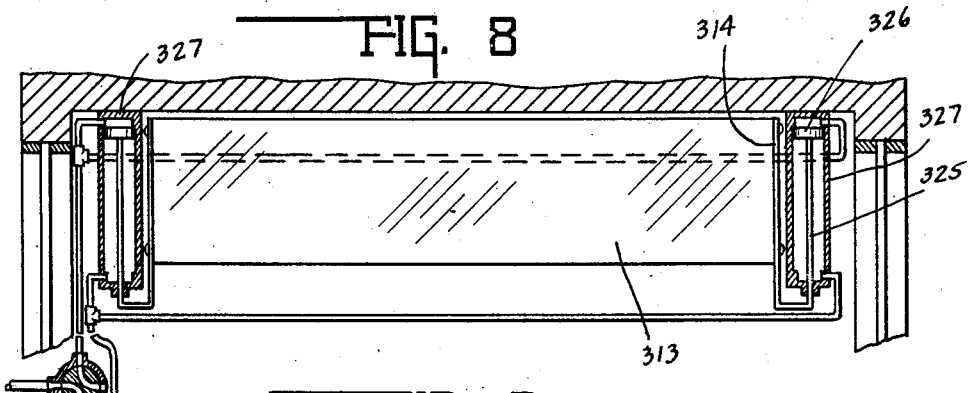
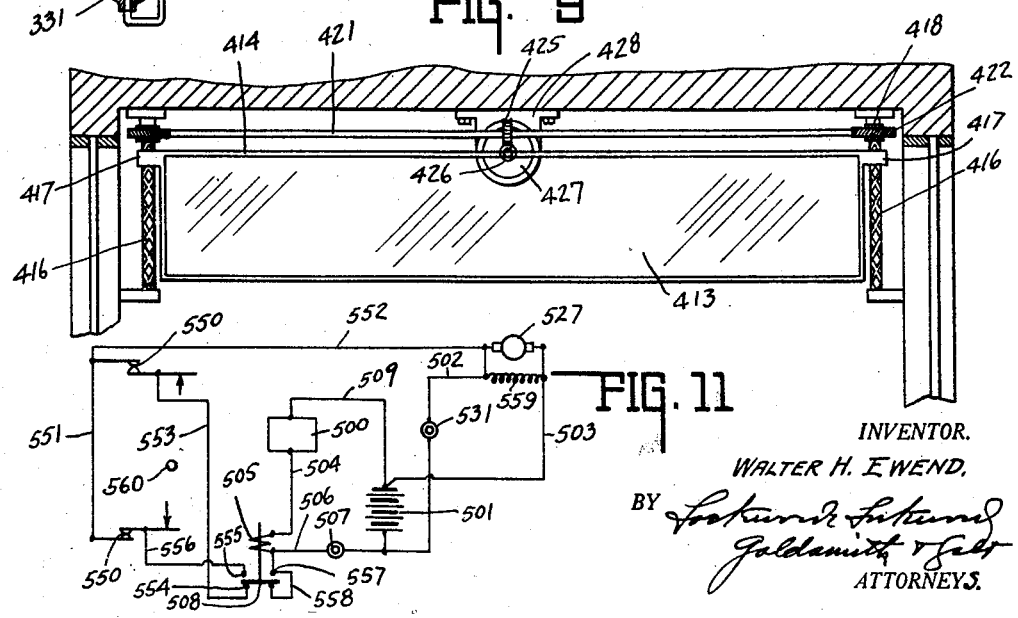
INVENTOR.
WALTER H. EWEND,
BY
ATTORNEYS.

Patented Apr. 19, 1932

1,854,892

UNITED STATES PATENT OFFICE

WALTER H. EWEND, OF DETROIT, MICHIGAN

GLARE SHIELD FOR VEHICLES

Application filed February 23, 1929. Serial No. 342,041.

This invention relates to glare shields and visors.

The chief object of this invention is to provide a vehicle with a glare shield, or the like, that is power actuated and remotely controlled such that the operator does not have to materially shift his position nor divert his attention from driving to control the same.

Another object of the invention is to provide an automatic control for a mechanism of the aforesaid character which upon the reception of light rays thereby will automatically actuate the power mechanism for moving the shield into operative position.

One feature of the invention in addition to the accomplishment of the foregoing objects consists in the mounting of the glare shield within the vehicle and at any desired location thereon where shielding is desired, such as preferably behind the wind shield, in front of the rear window or within the vehicle adjacent each window and along the side of the vehicle or in the doors thereof.

The full nature of the invention will be more fully understood from the accompanying drawings and the following description and claims:

In the drawings Fig. 1 is a transverse sectional view through a portion of a figure, parts being broken away and the invention being included therein and positioned in retracted relation, the dotted lines indicating a portion in shielding position. Fig. 2 is a side elevation of the interior of the vehicle and is a vertical section taken on line 2—2 of Fig. 1 and includes the direction of the arrows. Fig. 3 is an enlarged transverse sectional view taken on line 3—3 of Fig. 2 and in the direction of the arrows. Fig. 4 is an elevational view of a modified form of the invention. Fig. 5 is a side view of the same. Fig. 6 is an elevational view of a second modified form. Fig. 7 is a side view thereof. Fig. 8 is a view similar to Fig. 1 and of a modified form. Fig. 9 is a view similar to Figs. 1 and 8 and of a further modified form. Fig. 10 is a view similar to Fig. 2 of the form shown in Fig. 9. Fig. 11 is a wiring diagram of an electric circuit embodying the invention and including a further modification thereof.

The invention is illustrated as applied to and associated with a wind shield construction but the same may readily be applied to the rear window of a motor vehicle or any one of the side windows or door windows thereof.

In Figs. 1 to 3 of the drawings 10 indicates a U-shaped track, guide or channel suitably provided with guide rollers 11. Each track or channel is positioned at opposite ends of the wind shield and preferably within the vehicle and immediately adjacent the wind shield. An upright or standard 12 is formed from a strip of metal folded substantially T-shaped between portions of which is clamped the screen 13. The nested or retracted position thereof is shown by full lines in Fig. 1 and the operative or shielding position is shown by the dotted lines therein.

Secured to the top of the shield 13 is a rod 104 that extends across the front of the vehicle and the end of the rod indicated at 14 is pivoted to a chain 15 carried by a sprocket wheel 16. The chain 15 passes over an idler 17 and power is imparted to the chain through the gear 18 rigid with the upper sprocket 16. The gear and sprocket are mounted upon a stub shaft and the sprockets 16 face each other with the gears upon the outside so that the shield 13 can readily reciprocate therebetween. As the sprockets rotate the rod end 14 follows the path of the chain, and when it has reached its lowest position the shield is fully projected and serves to block out the bright rays. The shield preferably is of translucent material capable of eliminating glare but not preventing complete vision.

At opposite sides in the brackets 20 there is rotatably mounted a shaft 21 which mounts pinions 22 that mesh with gears 18. The shaft 21 also mounts a gear 23 that meshes with a pinion 24 of a reduction gearing including the gear 25 driven by pinion 26 of the motor 27 mounted in bracket 28. Mounted at any convenient location, such as on the dash 30 or upon the foot board is a switch member 31 which may be manually actuated by pressing with the hand or with the foot respectively, and said switch closes the circuit to the motor and the latter serves to drive the power mechanism to project or retract the shield as desired.

When the glare shield is positioned adjacent the wind shield the glare shield may be projected and maintained projected when driving against the rising or setting sun, as well as against an oncoming light, or when mounted upon the rear against a trailing light. The control 31 preferably is of the two position type and is released when the shield is in the desired position. The motor may be directly connected to the usual battery and the circuit would then be controlled through the switch button 31.

In Figs. 4 and 5 a modified form of the invention is illustrated and in this form the motor 127 mounted as at 128 drives pinion 126 that meshes with the enlarged gear 118. An eccentrically mounted pivot 114 is carried by said gear and pivotally supports on a loose pivot the glare shield 113. The gear 118 is mounted upon a stub shaft supported by bracket 120. The mounting of the shield upon the pivot 114 is such that the shield reciprocates and is sufficiently wide to provide the desired obstruction to the glare and permit the driver to proceed under the desired protection. The motor 127 is controlled in a similar manner as heretofore set forth. The weight is sufficient to maintain the desired depending position.

Figs. 6 and 7 illustrate a modified form of the invention wherein the motor 227 supported at 228 drives the pinion 226 that meshes with a gear 218 mounted upon a stub shaft carried by bracket 220. Positioned thereneath and also mounted on a stub shaft is a sprocket 217 over which rides a chain 215 that also rides over a sprocket wheel 216 rigid with the gear 218. The pin 214 pivotally supports shield 213 in the manner set forth previously. This form of the invention is a combination of the two forms of the invention previously set forth.

In Fig. 8 there is illustrated a modified form of the invention and this is of the pneumatic type. By pneumatic type is meant a pneumatic pressure system, or a vacuum system. Herein the pressure system is illustrated although the same principle could be applied to a vacuum actuated variation thereof. In this form of the invention a control valve indicated generally at 331 is connected to a pair of cylinders 327 in which is mounted pistons 326 carried by stems 325 that are secured to standards or uprights 314 which support the shield 313. The piping connections are such that the two pistons are similarly and simultaneously actuated. The valve 331 is adapted to simultaneously connect one pressure side of cylinder to atmosphere and the other pressure side to the air supply or the like and vice versa. Valve 331 is held in the position shown in Fig. 8 when the screen is to be retracted. The valve may be adapted to cut off the air supply entirely and in this event the friction of the parts should be sufficient to hold the screen in elevated position against vibration. If it is not sufficient then the pressure should be maintained to hold the screen in elevated relation.

It will be apparent that if the motor circuit for any one of the motors 27, 127, 227 or 427 be maintained closed a sufficient period then the screen will be automatically reciprocated. If such reciprocation exceeds 16 times per minute (the persistency of vision) then the effect will be substantially that of permanent lowering of the screen. If this type of construction is desired or employed with the modification of the invention shown in Fig. 8 it will be necessary to add to the piping circuit a suitable reversing valve arrangement actuated by travel limit valves. This addition and modification is well known in the pneumatic art and needs no further description. The operation of such travel limit mechanism is, however, illustrated herein in the last modification set forth to which reference is had hereinafter.

In Figs. 9 and 10 a modified form of the invention is illustrated. In this form the motor is indicated by the numeral 427, support therefor 428, the worm and worm wheel reduction 426 and 425 respectively, the power shaft therefrom 421 and said shaft terminated in worms 422 which mesh with the worm wheels 418. The shaft 416, an extension of the wheel 418, includes the reverse thread arrangement and associated therewith is the lug 417 carried by the frame member 414 which supports the shield 413. In this form of the invention intermittent alternate reciprocation is obtained by actuating the control previously described, or continuous alternate reciprocation may be obtained by maintaining the motor circuit in closed circuit relation.

Fig. 11 illustrates a wiring diagram, certain parts of which are applicable to any of the modifications of the invention previously described and certain other parts of which present a further modification wherein operation of the screen is automatically secured by means of a light responsive element.

In this diagram a motor 527 is illustrated which may correspond to any of the motors 27, 127, 227 or 427 previously described. The motor is preferably of the shunt wound, direct current type having a shunt field coil 559 connected directly across its armature terminals. A battery or other source of energy is indicated by the numeral 501. The terminals of the battery and the terminals of the motor armature are connected by lines 502 and 503, in one of which is placed a switch 531. The switch 531 corresponds to the manual switch 31 before mentioned and may be operated either manually or by the foot of the operator to control the motor. This portion of the wiring diagram applies equally well to each of the various modifications of the apparatus heretofore shown in Figs. 1 to 7 inclusive and Figs. 9 and 10.

When it is desired to continuously reciprocate the screen, the switch 531 is maintained in the closed circuit position. The motor then continuously operates in one direction and, by the mechanism heretofore disclosed, alternately raises and lowers the screen. When it is desired to hold the screen in the up-raised position, the switch 531 is opened as the screen reaches that position. Similarly, if it is desired to hold the screen in the lowermost position, the switch 531 is opened as the screen reaches that position.

To obtain automatic operation responsive to the action of light from an approaching car or from the rising or setting sun, a light-responsive cell 500, for example of the selenium type, is provided. The cell may be positioned as indicated by dotted lines in Fig. 1 and is connected to one terminal of the battery 501 by means of the line 509. The other terminal of the battery 501 is connected by a line 506 to one terminal of a relay coil 505. The opposite terminal of the said coil is connected by a line 504 with the opposite terminal of the light-responsive cell 500. A cutout switch 507 is included in the line 506 for cutting in or out the automatic feature as desired.

Since the light-responsive cell generally does not provide sufficient current to secure direct motor operation, the coil 505, which has a slight current consuming capacity, operates a relay having a switch member 508. The switch member 508 may be connected directly in parallel with the switch 531 and thereby afford continuous operation of the raising and lowering of the screen. However, in the embodiment shown in Fig. 11, the said switch member is adapted to control a circuit between the line 506 and a pair of travel limit switches 550. The relay is of the double circuit type and is adapted to connect line 506 with the lowermost switch 550 by means of a line 556 when the light-responsive cell is acted upon by a light sufficiently strong to energize the coil 505. When the light impinging on the cell 500 is not sufficient to energize the coil 505, the switch member 508 connects the line 506 with the uppermost switch 550 by means of a jumper connection 558 and a line 553. The switches 550 are operated by a suitable contact member 560 carried by the screen. The said contacting member contacts with the uppermost switch and opens the same when the screen reaches the uppermost position and similarly opens the lowermost switch when the screen reaches the lowermost position. The opposite terminals of each of the switches are connected together by a line 551 and are connected by line 552 to one of the motor terminals. By the operation of this wiring, a light impinging on the cell 500 energizes the coil 505 and thereby energizes the motor through the lowermost switch 550. The motor then lowers the screen until the limit switch contact is broken and the screen then remains in that position as long as the said light impinges upon the cell 500. Upon the removal of the light, the coil 505 is deenergized and the motor is energized through the uppermost switch 550. Upon the screen reaching its uppermost position, the switch 550 is opened and the motor stops.

Numerous other modifications and forms of the automatic and manual control are possible without departing from the broader features of the invention.

The invention claimed is:

1. In combination, a glare shield, an endless chain or the like, a glare shield support secured thereto and movable therewith, a glare shield pivotally suspended from said support, a continuously rotating power for the chain or the like, and a control for said power.

2. In combination, a glare shield, a support therefor having substantially reciprocatory movement, an electric motor, mechanism interposed between said motor and support for reciprocating the latter by the former, a light responsive unit, and means interposed between said motor and unit and responsive to the latter for controlling the motor.

3. In combination, a glare shield, a support therefor having substantially reciprocatory movement the glare shield pivotally suspended from the support, an electric motor, mechanism interposed between said motor and support for reciprocating the latter by the former, travel limit control members, and a control associated therewith and the motor for securing predetermined motor operation.

4. In combination, a glare shield, a support therefor having substantially reciprocatory movement, an electric motor, mechanism interposed between said motor and support for reciprocating the latter by the former, travel limit control members, a light responsive unit, and means associated with the unit, members and motor for securing predetermined motor operation.

5. In a vehicle a glare shield member associated therewith and adapted to protect an occupant thereof from glaring illumination from without the vehicle, the glare shield pivotally suspended from and carried by movable support means, the support means movable to position the glare shield in the line of vision between an external light source and the eye of an occupant of the vehicle, there being associated with the glare shield member, controllable mechanical means bodily moving the glare shield support means to project the glare shield into and retract it from the line of vision.

6. In a vehicle a glare shield member associated therewith and adapted to protect an occupant thereof from glaring illumination from without the vehicle, the glare shield pivotally suspended from and carried by movable support means, the support means movable to position the glare shield in the line of vision between an external light source and the eye of an occupant of the vehicle, there being associated with the glare shield member controllable mechanical means selectively and bodily moving the glare shield support means to project the glare shield into the line of vision, and to retract the glare shield from the line of vision.

7. In a vehicle having a windshield, a glare shield mounted adjacent the windshield and adapted to protect the driver thereof from glaring illumination without the vehicle, a movable support means for the glare shield, the support means mounted on a driven member operating in a closed path and carrying the support means through a path whose greatest component is the vertical, the glare shield pivotally mounted on the support and reciprocated thereby upon operation of the driven member.

In witness whereof, I have hereunto affixed my signature.

WALTER H. EWEND.